United States Patent [19]
Porter et al.

[11] Patent Number: 5,323,428
[45] Date of Patent: Jun. 21, 1994

[54] READILY DISCONNECTABLE NOZZLE ARRANGEMENT FOR USE WITH NUCLEAR REACTOR

[75] Inventors: Douglas S. Porter, Simsbury, Conn.; Mark W. Yorns, Ware, Mass.

[73] Assignee: Combustion Engineering, Inc., Windsor, Conn.

[21] Appl. No.: 999,408

[22] Filed: Dec. 31, 1992

[51] Int. Cl.⁵ .......................................... G21C 13/00
[52] U.S. Cl. ................................. 376/204; 376/205; 285/138; 285/169
[58] Field of Search ................ 376/204, 205; 285/138, 285/348, 169

[56] References Cited

U.S. PATENT DOCUMENTS

| | | | |
|---|---|---|---|
| 1,481,909 | 1/1924 | Jones | 92/206 |
| 2,177,040 | 10/1939 | Huhn | 308/237 |
| 2,586,871 | 2/1952 | Shields | 277/88 |
| 4,421,714 | 12/1983 | Dronkers | 376/204 |
| 4,480,841 | 11/1984 | Schukei et al. | 376/204 |
| 4,655,483 | 4/1987 | Margotta | 285/169 |
| 4,723,795 | 2/1988 | Shenoy | 285/138 |
| 4,815,884 | 3/1989 | Halliday, Jr. et al. | 403/13 |

FOREIGN PATENT DOCUMENTS 263042 4/1988 European Pat. Off.
2603682 3/1988 France.

Primary Examiner—Donald P. Walsh
Assistant Examiner—Frederick H. Voss
Attorney, Agent, or Firm—Ronald P. Kananen

[57] ABSTRACT

In order to reduce the time and difficulty of disassembling a seal arrangement which includes a Grayloc flange, in a cramped radioactive environment, the Grayloc hub is modified to include a step bore which receives a seal arrangement and a retaining nut which presses the seal into engagement with an inner wall portion of the hub and outer wall portion of an ICI (in core instrument) supporting column. A loading ring is threaded onto a portion of the column. Bolts associated with the ring are screwed down onto a belleville washer which is disposed between the loading ring and the top of the retaining nut for maintaining a desired amount of load on the seals irrespective of thermal variations.

10 Claims, 5 Drawing Sheets

READILY DISCONNECTABLE NOZZLE ARRANGEMENT FOR USE WITH NUCLEAR REACTOR

BACKGROUND OF THE INVENTION

1. Field of the Invention

The present invention relates to nozzles assemblies and more specifically to nozzle assemblies which enable quick and easy connection/disconnection in cramped and hazardous environments such as encountered in nuclear reactors.

2. Description of the Prior Art

It is essential that a hermetic radiation proof seal be maintained between the interior and exterior of a pressure vessel such as a nuclear reactor. It is also necessary to monitor the operations of a reactor using In-Core-Instruments (ICI). However, this latter requirement necessitates the provision of nozzles through which the instruments can be sealingly introduced into the core. Examples of such an arrangements are shown in U.S. Pat. No. 4,723,795 issued on Feb. 9, 1988 in the name of Shenoy and U.S. Pat. No. 4,655,483 issued on Apr. 7, 1987 in the name of Margotta. The documents discloses techniques for providing fluid tight connections between a nozzle and a column which is concentrically supported within the nozzle.

FIG. 1 shows a less preferred embodiment of the type of nozzle to which the present invention pertains. This arrangement is such as to provide a fluid tight radioactive proof seal for a plurality of ICI (In Core Instruments) and allows the operative connection with external controls and monitoring arrangements.

This arrangement features the use of a Grayloc hub 10 which is clamped securely to a Grayloc flange 12 formed at the upper end of an ICI nozzle 14. However, with this arrangement when it is required to disassemble the same, the Grayloc clamp 16 is unbolted and each individual ICI nut 18 is then removed and the individual ICI's are then clustered together under a bullet nose. The above-mentioned Graylock hub and Graylock clamp are products of the Gray Tool Company, Houston, Tex.

However, this induces the drawback that the disassembly process is both strenuous and time consuming. It is also carried out in very cramped conditions and in a radioactive environment. Accordingly, the operators are required to wear protective suiting and must be careful to watch the amount of time for which they are exposed to the radiation.

Accordingly, there is a need for an arrangement which can reduce both the effort and time required to achieve the disassembly of an ICI nozzle which is carried out each time a refueling or instrument change is required, in order to reduce the reactor down time and more importantly to reduce the health risks associated with working the above mentioned hazardous environment.

SUMMARY OF THE INVENTION

It is an object of the present invention to provide a nozzle assembly for use with nuclear reactors and the like type of pressure vessels, which nozzle design enables very quick disassembly and which reduces the difficulty and amount of physical effort required to achieved said disassembly.

In brief, seal arrangement which includes a Grayloc flange features a modified Grayloc hub in which a stepped bore receives a grafoil seal arrangement and a retaining nut which presses the grafoil seal into engagement with an inner wall portion of the hub and outer wall portion of an ICI (in core instrument) supporting column. A loading ring is threaded onto a portion of the column. Bolts associated with the ring are screwed down onto a belleville washer which is disposed between the loading ring and the top of the retaining nut for maintaining a desired amount of load on the seals irrespective of thermal variations.

More specifically, a first aspect of the invention comes incomes in a device which features a hub which is clamped to a flange formed on the upper end of a nozzle in manner to establish a hermetic seal between the hub and the flange, the hub being formed with a stepped bore therein through which a column member extends; seal means disposed in the bore about the column member; a retaining nut threadedly received in the stepped bore, the retaining nut being adapted to press the seal means into sealing engagement with a wall portion of the stepped bore and a wall portion column member which is located within the stepped bore in a manner which establishes a hermetic seal between the hub and the column member; a resilient washer disposed on the upper side of the retaining nut; and an annular load ring which is threadedly received on a portion of the column, the load having a plurality through holes in which bolts are threadedly received and adjust the pressure applied by the resilient washer to the top of the retainer nut.

A second aspect of the present invention comes in a sealing arrangement for device having a nozzle portion and a column member disposed through the nozzle portion, which features: a hub which is clamped to a flange formed on the upper end of the nozzle in manner to establish a hermetic seal between the hub and the flange, the hub being formed with a stepped bore through which the column member extends; seal means disposed in the bore about the column member, the seal being supported by a seal carrier; a retaining nut threadedly received in the stepped bore, the retaining nut being adapted to press the seal into sealing engagement with a wall portion of the stepped bore and a wall portion column member which is located within the stepped bore in a manner which establishes a hermetic seal between the hub and the column member; and an annular load ring which is threadedly received on a portion of the column, the load ring including means for selectively applying a force to the top of the retainer nut.

A third aspect of the present invention comes in a nuclear reactor including an in-core-instrument, a head which is lifted when the reactor is refuelled, and a nozzle arrangement which includes a column arrangement through which the in-core-instrument is disposed, the nozzle comprising: a Grayloc flange which is associated with the nozzle; a Grayloc hub releasably connected to the Grayloc flange; a stepped bore formed in the Grayloc hub through which the column arrangement is disposed; a grafoil seal arrangement disposed in the stepped bore; a retaining nut which is threadedly received in the stepped bore and which can apply a pressure to the grafoil seal arrangement; loading means threadedly received on the column arrangement for applying pressure on the retaining nut.

A further aspect of the invention comes in that the arrangement set forth above further features: an elastomeric spacer which can be inserted into the stepped bore when the retaining nut is removed, the elastomeric spacer protecting threads which are formed on the wall of the stepped bore and engaging the external wall of a bullet shaped cover which is placed over the top of the column arrangement when the nuclear reactor is conditioned for a predetermined operation.

BRIEF DESCRIPTION OF THE DRAWINGS

The present invention will become more clearly appreciated as the disclosure of the present invention is made with reference to the accompanying drawings wherein.

DETAILED DESCRIPTION OF THE PREFERRED EMBODIMENTS

Figure 1:
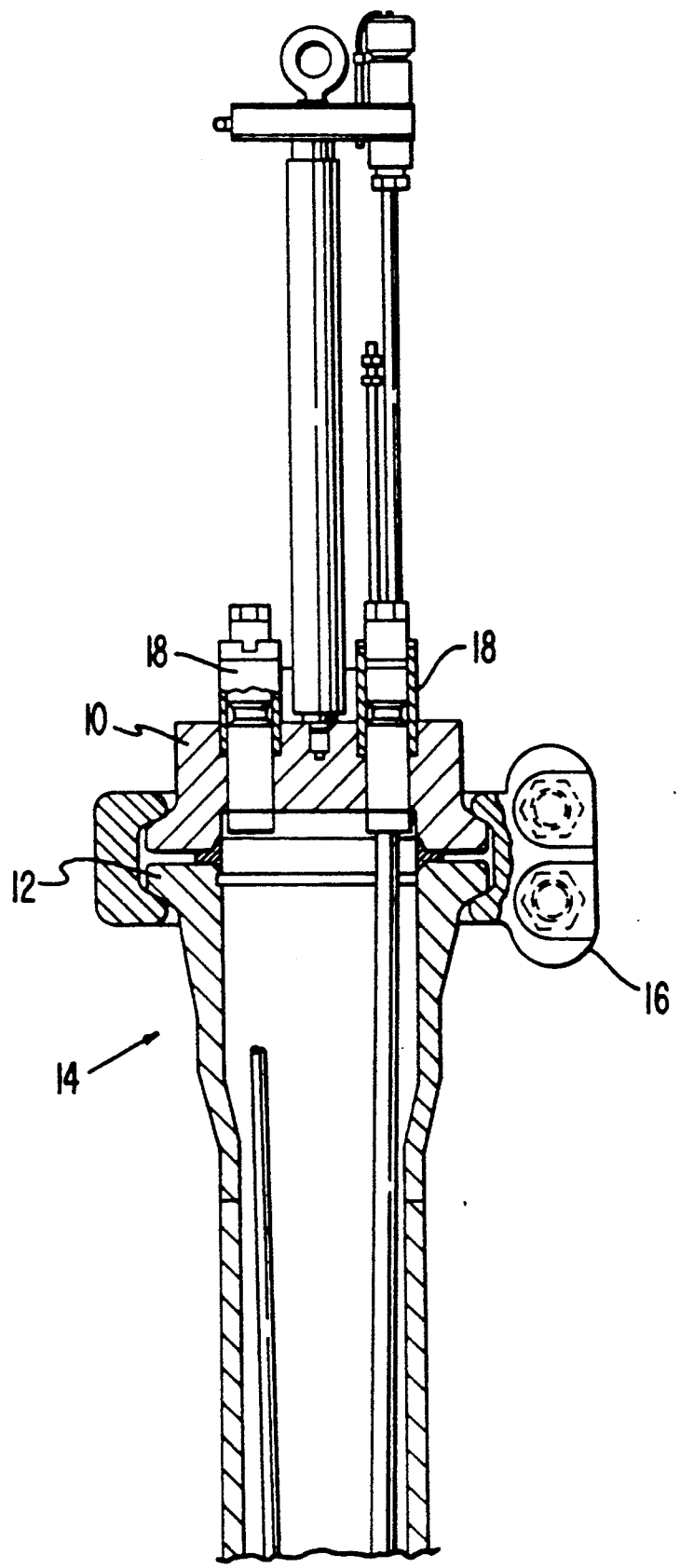
FIG. 1 is a sectional view showing the less preferred Grayloc nozzle assembly discussed in the opening paragraphs of the instant disclosure.
Figure 2:
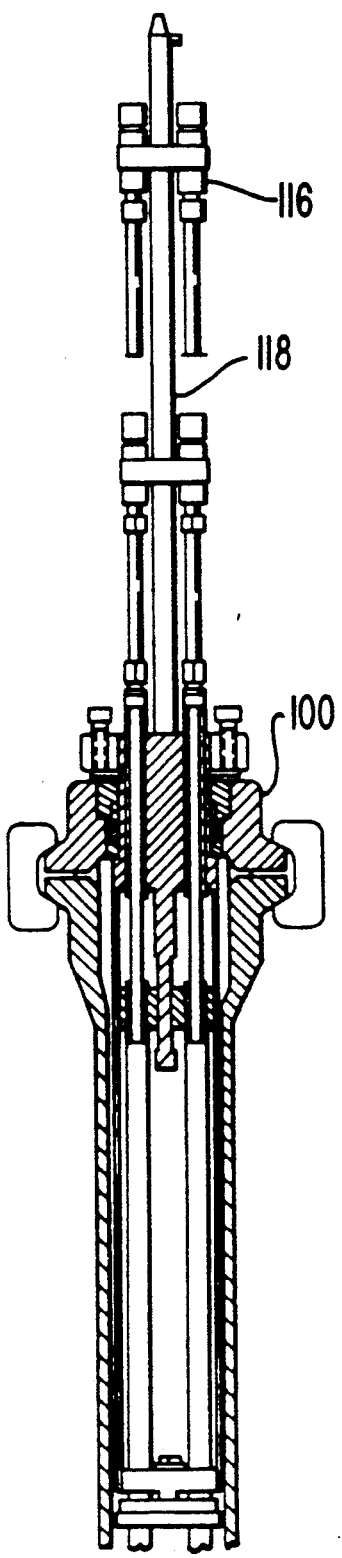
FIG. 2 is a sectional view showing a nozzle arrangement according to a preferred embodiment of the present invention.
Figure 3:
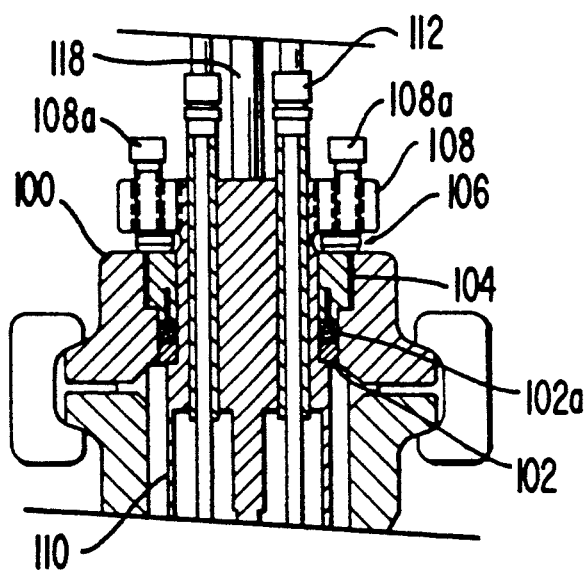
FIG. 3 is a an enlarged view showing the elements which are essential to the nozzle arrangement according to the preferred embodiment of the present invention.
Figure 4:
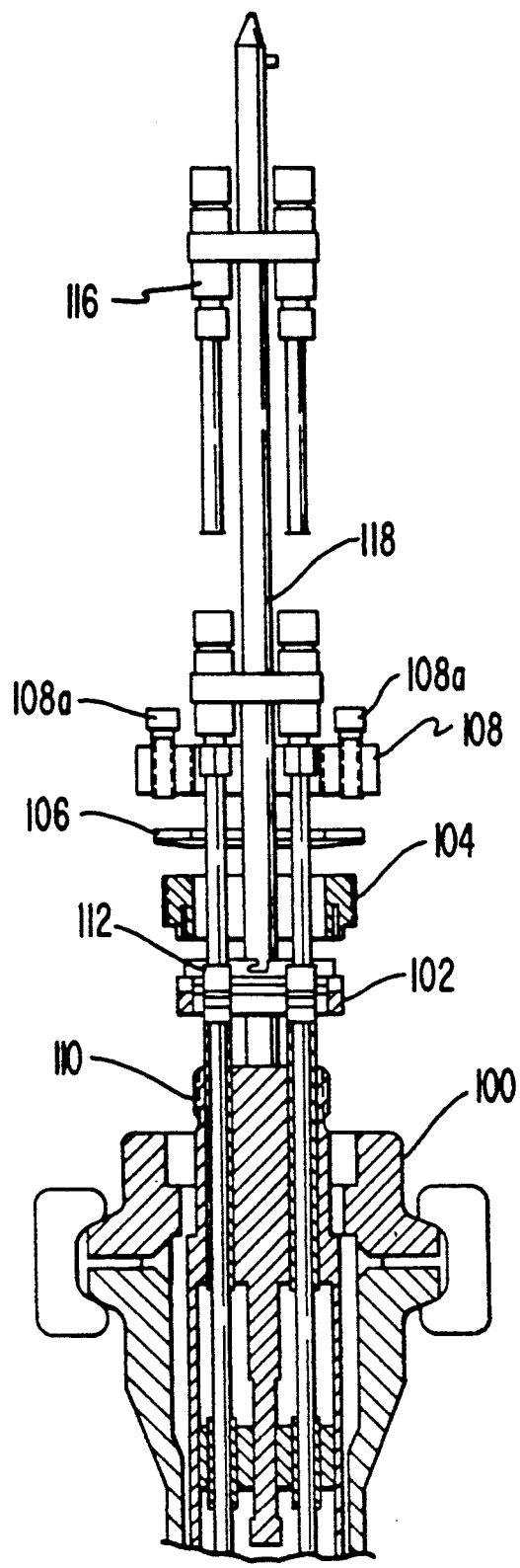
FIG. 4 is a exploded sectioned view showing the elements which characterize the embodiment of the present invention shown.
Figure 5:
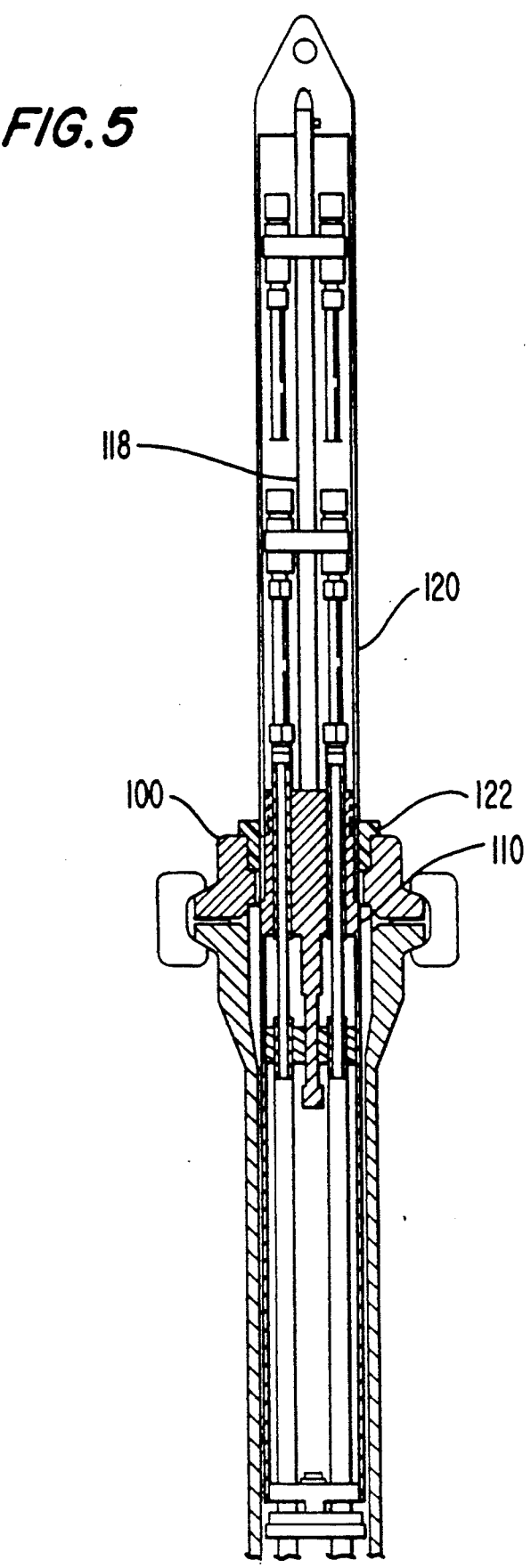
FIG. 5 is a sectional view showing the nozzle arrangement of FIG. 1 after a bullet nose has been fitted.
Figure 6A:
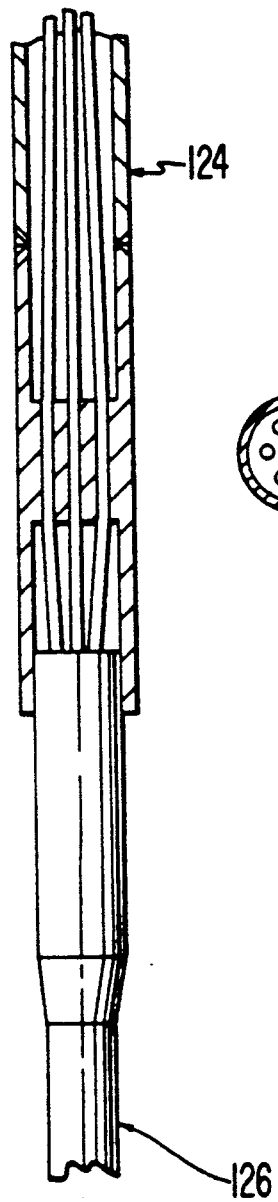
FIG. 6A is a sectional view showing the structure of a detector seal plug associated with one of the ICI instruments.
Figure 6B:
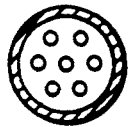
FIG. 6B is a sectional view of the seal detector plug shown in FIG. 6A.

FIGS. 2 to 5 show details of a preferred embodiment of the present invention. This embodiment features a basic combination of a modified Grayloc hub 100, a seal carrier 102, a retaining nut 104, a belleville washer 106, a loading ring 108 and a column assembly 110. The modified Grayloc hub 100 forms a pressure boundary at the top of the nozzle. It has a clearance fit with the column assembly 110 and includes a stepped bore the upper larger diameter portion of which is threaded to react the loading of the retaining nut 104. It should be noted that with the present invention disassembly of the Grayloc flange is not required for removal of the reactor head.

In this arrangement the column assembly 110 serves to allow the penetration of a plurality of ICI (In-Core-Instruments) into the interior of the reactor core. The instant embodiment is such as to support 6 ICI and provides guidance for the guide tube cluster which is associated with the ICI. The ICI column assembly 110 includes six ¼" Swageloc fittings 112 and bolts to the guide tube cluster. The Swageloc are not loosened unless the ICI are to be discarded and replaced with new units.

The seal carrier 102 supports grafoil seals 102a and protects the same from damage during installation. A special T-handle tool is used to engage J-slots (see FIG. 4) Which are formed in a vertical web of the seal carrier 102 during installation and removal. A shown, the seal carrier 102 is disposed in the lower portion of a stepped bore formed in the modified Grayloc hub 100.

The retaining nut 104, which is threadedly received in the upper portion of the stepped bore of the Grayloc hub 100, is such as to react against the uplift of the column 110 and compress the grafoil seals 102a. The retaining nut 104 is formed with spanner holes in the upper surface thereof and does not require the application of large amounts of torque in order to thread the same into and out of place.

The belleville washer 106 is provided to ensure that a load is maintained on the grafoil seals 102a under all thermal conditions and further prevents loosening of the load ring 108.

As will be appreciated, load ring 108 is provided to apply a load to the grafoil seals 102a. In this embodiment it threads onto a threaded portion of the column assembly and is provided with six ⅜" bolts 108a which can be screwed down onto the upper surface of the belleville washer 106 in order to apply the required compressive force to the grafoil seals 102a.

In this instance the ICI connectors 116 are staggered at three different elevations and are mounted on an integral bullet nose locking rod 118. During routine disassembly of the flange, there is no need to remove the connectors.

FIG. 7 shows the nozzle covered with a bullet nose 120 such as during refueling when the reactor head is lifted. As will be noted, in this instance a nylon thread protector 122 is inserted into the upper section of the stepped bore to ensure that insertion of the lower open end of the bullet nose 120 does not damage the threads and reduce the integrity of the sealing effect which is provided thereby.

FIG. 8 is a partially sectional view of a detector seal plug which forms part of the instant embodiment. As shown, this device includes a support tube 124 which is welded to a swaged detector 126 and includes a plurality of leads which are brazed to a header in the manner illustrated. As this element is not directly connected with the invention, no further disclosure will be given for brevity.

It will be appreciated that the present invention is not limited to the exact construction which as been described above and which is illustrated in the accompanying FIGS. 2-5, and that various modifications and changes can be made without departing from the scope thereof.

What is claimed is:

1. In a device
   a hub which is clamped to a flange formed on the upper end of a nozzle in manner to establish a hermetic seal between said hub and said flange, said hub being formed with a stepped bore therein through which a column member extends;
   seal means disposed in said bore about said column member;
   a retaining nut threadedly received in said stepped bore, said retaining nut being adapted to directly engage and press said seal means into sealing engagement with a wall portion of said stepped bore and a wall portion column member which is located within said stepped bore in a manner which establishes a hermetic seal between said hub and said column member;
   a resilient washer disposed on the upper side of said retaining nut; and
   an annular load ring which is threadedly received on a portion of said column, said load having a plurality through holes; and
   a plurality of bolts respectively threadedly received in said plurality of through holes, said bolts being arranged to adjust the pressure applied by said resilient washer to the top of said retaining nut.

2. A sealing arrangement as set forth in claim 1, further comprising a belleville washer which is interposed between said annular load ring and said retaining nut; and wherein said means for selectively applying a force to the top of said retainer nut comprises a plurality of bolts which are threadedly received in threaded bores formed in said annular load ring, said plurality of bolts being arranged to directly engage said belleville washer and to produce a reaction which tends to drawn said column member in a direction wherein a shoulder which is formed about said column member engages and compresses said seal means.

3. A sealing arrangement for device having a nozzle portion and a column member disposed through said nozzle portion, comprising:

a hub which is clamped to a flange formed on the upper end of said nozzle in manner to establish a hermetic seal between said hub and said flange, said hub being formed with a stepped bore through which said column member extends;

seal means disposed in said bore about said column member, said seal being supported by a seal carrier;

a retaining nut threadedly received in said stepped bore, said retaining nut being adapted to directly press said seal into sealing engagement with a wall portion of said stepped bore and a wall portion column member which is located within said stepped bore in a manner which establishes hermetic seal between said hub and said column member; and an annular load ring which is threadedly received on a portion of said column, said load ring including means for selectively applying a force to the top of said retainer nut.

4. A sealing arrangement as set forth in claim 1 wherein said seal means includes a seal carrier which is received at the bottom of the stepped bore and at least one graphite containing seal member carried on said seal carrier.

5. A sealing arrangement as set forth in claim 3 wherein said seal means includes a seal carrier which is received at the bottom of the stepped bore and at least one graphite containing seal member carried on said seal carrier.

6. In a nuclear reactor including an in-core-instrument, a head which is lifted when the reactor is refuelled, and a nozzle arrangement which includes a column arrangement through which the in-core-instrument is disposed, said nozzle comprising:

a flange formed about an upper portion of said nozzle;
a hub releasably connected to said flange by a clamp;
a stepped bore formed in said hub through which said column arrangement is disposed;
a grafoil seal arrangement disposed in said stepped bore;
a retaining nut which is threadedly received in said stepped bore and which can directly apply a pressure to said grafoil seal arrangement; and
loading means threadedly received on said column arrangement for applying pressure on said retaining nut.

7. A nuclear reactor as set forth in claim 6 further comprising:

an elastomeric spacer which can be inserted into said stepped bore when said retaining nut is removed, said elastomeric spacer protecting threads which are formed on the wall of said stepped bore and engaging the external wall of a bullet shaped cover which is placed over the top of said column arrangement when the nuclear reactor is conditioned for a predetermined operation.

8. A nuclear reactor as set forth in claim 6 wherein said loading means comprises a loading ring which is threadedly connected to said column arrangement and a resilient washer interposed between said loading ring and said retaining nut.

9. A nuclear reactor as set forth in claim 8 wherein said loading ring includes a plurality of bolts which can be screwed down on said resilient washer in a manner which adjustably varies the pressure applied by said resilient washer to said retaining nut.

10. A nuclear reactor as set forth in claim 8, wherein said loading means further includes a plurality of bolts which are respectively disposed in a plurality of threaded bores formed in said loading ring, said bolts engaging said resilient washer in a manner which distorts said resilient washer and produces a reaction which tends to move a shoulder which is formed on said column arrangement and on which said graphoil seal rests, toward said retaining ring and induces compression of said graphoil seal.

* * * * *